(12) United States Patent  (10) Patent No.: US 9,270,127 B2
Coenen et al.  (45) Date of Patent: Feb. 23, 2016

(54) METHOD AND SYSTEM FOR BALANCING ELECTRICAL CELLS (75) Inventors: Peter Coenen, Glabbeek (BE); Dominique Weyen, Lommel (BE)

(73) Assignee: VITO N.V., Mol (BE)

( * ) Notice: Subject to any disclaimer, the term of this patent is extended or adjusted under 35 U.S.C. 154(b) by 533 days.

(21) Appl. No.: 13/497,883

(22) PCT Filed: Sep. 21, 2010

(86) PCT No.: PCT/EP2010/063884
§ 371 (c)(1), (2), (4) Date: Mar. 23, 2012

(87) PCT Pub. No.: WO2011/036147
PCT Pub. Date: Mar. 31, 2011

(65) Prior Publication Data
US 2013/0127419 A1  May 23, 2013

(30) Foreign Application Priority Data
Sep. 24, 2009  (EP) ..................................... 09171289

(51) Int. Cl.
*H02J 7/00*  (2006.01)

(52) U.S. Cl.
CPC ............. *H02J 7/0014* (2013.01); *H02J 7/0018* (2013.01); *H02J 7/0019* (2013.01); *H02J 7/0026* (2013.01); *Y02T 10/7055* (2013.01)

(58) Field of Classification Search
CPC ...................................................... H02J 7/0014
USPC .......................... 320/116, 117, 118, 119, 166
See application file for complete search history.

(56) References Cited

U.S. PATENT DOCUMENTS 5,804,944 A * 9/1998 Alberkrack et al. .......... 320/163
7,812,572 B2 * 10/2010 Bolz et al. .................... 320/166
(Continued)

FOREIGN PATENT DOCUMENTS

DE  102007045836 A1  4/2008
EP  1283580 B1  11/2007
(Continued)

OTHER PUBLICATIONS

International Search Report in PCT/EP2010/063884, Jun. 30, 2011.
(Continued)

*Primary Examiner* — Drew A Dunn
*Assistant Examiner* — Zixuan Zhou
(74) *Attorney, Agent, or Firm* — Bacon & Thomas, PLLC (57) ABSTRACT

The present invention relates to a system for charge balancing over a plurality of rechargeable energy storage devices coupled in series, said system comprising a plurality of balancing units each assigned to one of the rechargeable energy storage devices, an AC signal generator for providing an AC signal to the plurality of balancing units, and a capacitive coupling between the AC signal generator and each of the plurality of balancing units for common mode rejection. A first balancing unit comprises a plurality of switches for transferring, on the one hand, charge from the AC signal generator or from an energy storage device assigned to another balancing unit for charging the energy storage device assigned to the first balancing unit, and, on the other hand, for transferring charge to the AC signal generator or to an energy storage device assigned to another balancing unit for discharging the energy storage device assigned to the first balancing unit.

14 Claims, 5 Drawing Sheets

(56) References Cited

U.S. PATENT DOCUMENTS

| | | | |
|---|---|---|---|
| 8,288,999 B2 * | 10/2012 | Hsu et al. .................. 320/137 |
| 2008/0030167 A1 | 2/2008 | Hsu et al. |
| 2008/0084184 A1 | 4/2008 | Ohnuki |
| 2010/0164430 A1 * | 7/2010 | Lu et al. .................. 320/103 |

FOREIGN PATENT DOCUMENTS

| | | |
|---|---|---|
| EP | 2302757 A1 | 3/2011 |
| JP | 11032443 A | 2/1999 |
| WO | 2006058394 A1 | 6/2006 |
| WO | 2006100264 A2 | 9/2006 |

OTHER PUBLICATIONS

International Preliminary Report on Patentability, with annex and Applicant's arguments in PCT/EP2010/063884, Jan. 10, 2012.

Japanese Office Action dated Oct. 21, 2014, for JP 2012-530243, and English translation thereof.

Canadian Office Action dated May 5, 2015, for CA 2,773,841.

* cited by examiner

METHOD AND SYSTEM FOR BALANCING ELECTRICAL CELLS

FIELD OF THE INVENTION

The present invention is related to energy storage in series-coupled rechargeable electrical energy storage devices, also called cells, and in particular to balancing systems for increasing or decreasing the voltage of a limited number of such electrical cells. The balancing systems provide means for balancing charge (voltage) differences between cells in a rechargeable energy storage system. The invention is particularly related to a balancing system and to a method of balancing for a series connection of electrochemical cells, more particularly ultracapacitors or lithium cells.

BACKGROUND OF THE INVENTION

Series strings of energy storage cells are extensively used as batteries in many applications, such as, as examples only, laptops, standby power supplies, electric vehicles. Imbalances in the charges of these cells tend to occur and grow over time, as the string is charged and discharged or even when the string is left charged but unused. This reduces the efficiency of the charging and discharging process, and also limits the life and capacity of the battery. It is therefore important to ensure the uniformity of charge for all cells in a battery or capacitor string. This is called balancing the cells.

When electrical capacitor cells connected in series are charged, each cell receives the same amount of charge. According to the capacity or state of health of the cell, the voltage across each of the cells may deviate from the expected or average voltage. Hence, as the energy E stored in a cell is given by $E=CU^2/2$, whereby C is the capacitance of the cell, and U is the voltage across the cell, the voltage U may be different for each cell, depending on the capacity or state of health of the cell. The energy stored in a cell should be as high as possible for any cell; however, the voltage across a cell should not be higher than the maximum voltage allowed for that cell. Hence, as soon as the maximum voltage for one cell is reached, there must be refrained from further charging the string, although other cells are not necessarily loaded up to their maximum voltage yet. This results in a decreased performance of the complete string of series connected cells.

Prior art attempts to balance cells have included providing a constant shunt resistor over all individual cells (passive balancing) or a means for measuring the voltage of each cell, and then switching a resistor across those with a higher charge in order to discharge them to the level of the cell with the lowest charge (active balancing). An example thereof is described in US-2002/195994. However, as most cells perform substantially identical between pre-determined boundaries, and the cells which deviate most often have a lower than expected or desired charge, this causes a wasteful loss of energy, because lots of cells need to be discharged. Moreover, this system produces heat which is undesirable in a battery container.

Alternative arrangements rely on charge transfer between cells (dynamic balancing). An example thereof is described in EP-1283580, where each energy storage device is assigned a circuit balancing unit which circuit balancing units are connected such that they draw power from their assigned energy storage device if voltage balancing is performed, and forward it to the series connection of energy storage devices. Balancing is achieved by means of an inverter and transformer for each cell for common mode rejection. Hence, this arrangement requires isolating windings, and expensive and bulky components.

DE-102007045836 discloses a charging device having an electric accumulator formed by a plurality of series-connected electric accumulator cells. The charging device is capable of charging individual ones of a plurality of electric accumulator cells. However, it is a disadvantage of this charging device that only charging or not charging is possible. In order to be able to charge individual electric accumulator cells while others are not charged, DE-102007045836 describes that an AC generator is needed for each cell. This is a further disadvantage.

It is desirable to increase the voltage of individual cells with a low voltage and/or to decrease the voltage of cells with a high voltage, as charging is limited by the highest voltage cell and discharging is limited by the lowest, hence battery capacity is determined by the two extremes.

SUMMARY OF THE INVENTION

It is an object of embodiments of the present invention to provide a charge balancing system and a charge balancing method which are able to balance the charge (voltage) across rechargeable energy storage devices connected in series and which obviate the drawbacks of devices and methods of the prior art. With balancing charge is meant that the rechargeable energy storage devices can be charged or discharged, depending on how an instantaneous electrical parameter of the rechargeable energy storage device differs from a corresponding reference parameter or the corresponding instantaneous electrical parameter of other cells.

The above objective is accomplished by a method and device according to the present invention.

In a first aspect, the present invention relates to a system for charge balancing as disclosed in the appended claims. In particular, embodiments of the present invention relate to a system for balancing charge over a plurality of rechargeable energy storage devices coupled in series, said system comprising a plurality of balancing units each assigned to one of the rechargeable energy storage devices, an AC signal generator for providing an AC signal to the plurality of balancing units for each balancing the charge on their assigned rechargeable energy storage devices, and a capacitive coupling between the AC signal generator and each of the plurality of balancing units for common mode rejection. It is an advantage of a system according to embodiments of the present invention that only one single AC generator is required for a plurality of balancing units.

In a system according to embodiments of the present invention, a particular balancing unit, hereinafter called first balancing unit, comprises a plurality of switches for transferring, on the one hand, charge from the AC signal generator or from an energy storage device assigned to another balancing unit for charging the energy storage device assigned to the first balancing unit, and, on the other hand, for transferring charge to the AC signal generator or to an energy storage device assigned to another balancing unit for discharging the energy storage device assigned to the first balancing unit.

In particular embodiments of the present invention, each balancing unit is provided with a plurality of switches as the hereinabove called first balancing unit.

The plurality of switches for transferring charge from or to the AC signal generator or from or to an energy storage device assigned to a balancing unit may comprise or may be active switches.

A system according to embodiments of the present invention may furthermore comprise a comparator for comparing an instantaneous electrical parameter such as voltage, charge, state of charge, state of health of the rechargeable energy storage device with a corresponding reference parameter. Voltage may be measured by a microcontroller and may either be transmitted to a main controller for comparison to the reference parameter, or may be compared locally with a pre-determined threshold value.

In particular embodiments, a balancing unit comprises exactly two switches. The balancing units may comprise a controller for controlling the switches. The controller may be adapted for controlling the switches based on a signal generated by the comparator.

A system according to embodiments of the present invention may furthermore comprise a main controller, i.e. a controller not local to the balancing units, for controlling which ones of the rechargeable energy storage devices need to be balanced. The main controller may then be adapted for determining the reference parameter for each individual balancing unit.

In such embodiments, the balancing system may furthermore comprise a data bus for communication between a local controller of a balancing unit and the main controller, preferably between the local controllers of each balancing unit and the main controller.

In accordance with embodiments of the present invention, the main controller is adapted for protecting the rechargeable energy storage devices against overvoltage and/or undervoltage. This may for example be obtained by replacing electrical braking, where energy from braking is used for charging the energy storage devices, by mechanical braking.

A system according to embodiments of the present invention may comprise a single AC signal generator common to the plurality of balancing circuits.

A system according to embodiments of the first aspect of the present invention may be incorporated in a rechargeable energy storage system.

In a second aspect, the present invention provides a rechargeable energy storage system comprising a string of rechargeable energy storage devices coupled in series, and a system for balancing charge over the rechargeable energy storage devices in accordance with embodiments of the first aspect of the present invention.

In a third aspect, the present invention relates to a method for charge balancing as disclosed in the appended claims. In particular, embodiments of the present invention relate to a method for balancing charge of a rechargeable energy storage device over a plurality of rechargeable energy storage devices coupled in series, the rechargeable energy storage devices having two terminals, said method comprising measuring an instantaneous electrical parameter across the terminals of the energy storage device, comparing the measured electrical parameter to a pre-determined parameter value, and depending on the comparison result, transferring charge to or away from the energy storage device by actuating switches. Transferring charge comprises providing an AC signal to a balancing unit coupled to the rechargeable energy storage device, the balancing unit applying the AC signal to the rechargeable energy storage device or not depending on the signal of the AC signal and the comparison result; transferring charge including common mode rejection by capacitive coupling.

It is an advantage of embodiments of the present invention that they provide a charge balancing device or method which can be used for an improved balancing of even large series connections of energy storage devices. It is an advantage of embodiments of the present invention that only a few cells need to be serviced, in which energy storage devices have voltages that deviate from an average cell voltage. It is an advantage of embodiment of the present invention that both the voltage of cells with a low voltage can be increased and voltage of cells with a high voltage can be reduced. It is an advantage of embodiments of the present invention that all cells can be charged or discharged towards any average cell voltage for the string of cells. It is an advantage of embodiments of the present invention that they provide a charge balancing device or method with which charging does not need to stop once a maximum voltage level is reached for one of the cells. It is an advantage of embodiments of the present invention that a plurality of cells can be serviced for charge balancing at the same time. It is an advantage of embodiments of the present invention that individual cell voltages can be measured. It is an advantage of embodiments of the present invention that cells can be protected against over and under voltage by communicating with the charger or load.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

According to a first aspect of the present invention, a system is provided for balancing charge over a plurality of rechargeable energy storage devices coupled in series.

Figure 1:
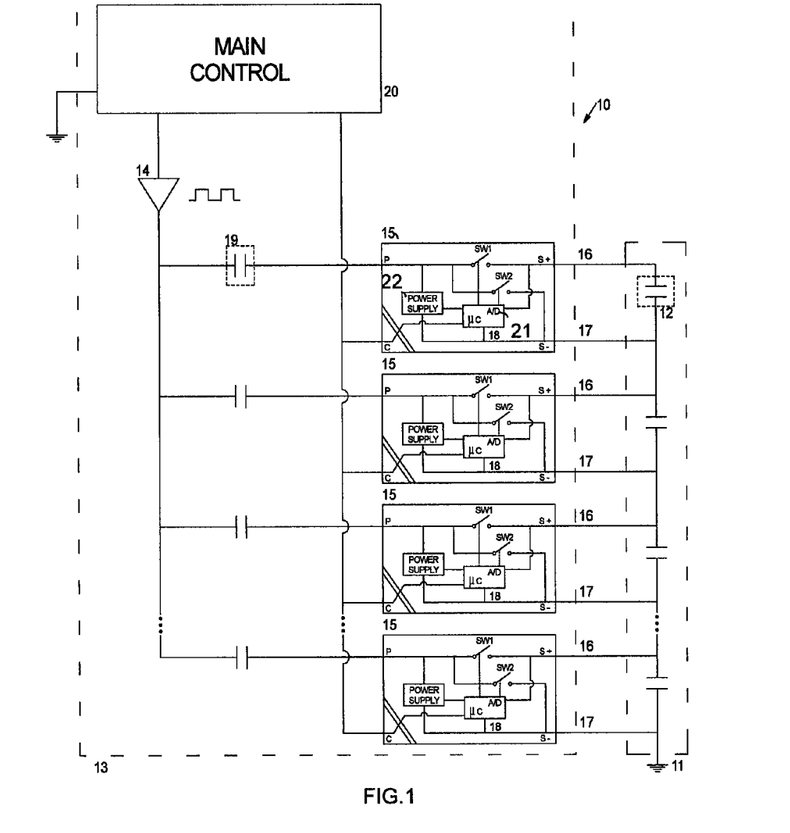
FIG. 1 illustrates a rechargeable energy storage system provided with a balancing system according to embodiments of the present invention.

FIG. 1 illustrates a rechargeable energy storage system 10 according to embodiments of the present invention, comprising a series string 11 of a plurality of energy storage devices 12, also called cells. The energy storage devices 12 are rechargeable. Each one energy storage device 12 can comprise a single energy storage cell or a parallel connection of multiple energy storage cells (not illustrated). The series-connected rechargeable energy storage devices 12 together form a battery, a pack or a stack. In accordance with embodiments of the present invention, the rechargeable energy storage devices 12 may be any type of rechargeable energy storage device. However, devices and methods of the present invention are advantageously used with ultracapacitors or lithium batteries. According to particular embodiments of the present invention, the energy storage devices 12 may be ultracapacitors, also known as supercapacitors or electric or electrochemical double-layer capacitors (EDLCs). These are electrochemical capacitors that have an unusually high energy density when compared to common capacitors; typically on the order of thousands of times greater than a high capacity electrolytic capacitor. Typical capacitance values may range from a few farads to a few thousands of farads. In alternative embodiments, the rechargeable energy storage devices 12 may be batteries, for example high energy-density batteries, such as for example Lithium or Lithium Ion (LiIon) batteries. Other kinds of rechargeable energy storage devices can equally be used. Preferred applications are in the fields of energy smoothing and momentary load devices, which require very high instant powers compared to the average power ratings.

In accordance with embodiments of the present invention, each rechargeable energy storage device 12 has a limited operating voltage, e.g. between 2 and 4 V. In order to obtain a useful operating voltage of, for example, a few tens to a few hundreds of Volts or even more, useful e.g. as an energy source in vehicle applications, a plurality, and sometimes a large number of rechargeable energy storage devices 12 need to be coupled in series. Slight differences between the energy storage devices 12 in a string or series-coupling can produce imbalances in the cell voltages, which may greatly reduce the string's charge capacity.

In order to alleviate this, a rechargeable energy storage system 10 according to embodiments of the present invention also comprises a system 13 for balancing charge over the plurality of rechargeable energy storage devices 12.

The system 13 for balancing charge comprises an AC signal generator 14 for charging or discharging one or more of the plurality of rechargeable energy storage devices 12. The system 13 furthermore comprises a plurality of balancing units 15. Each balancing unit 15 is assigned to one of the rechargeable energy storage devices 12. For optimal performance, each rechargeable energy storage device 12 is assigned a balancing unit 15.

Each energy storage device 12 in the string 11 is provided with a first terminal 16, which is its positive terminal, and a second terminal 17 which is its negative terminal. The energy storage devices 12 are coupled in the string 11 such that a positive terminal 16 of a first energy storage device 12 is coupled to a negative terminal 17 of a second energy storage device, and so on. The negative terminal 17 of the very first energy storage device 12 in the string, and the positive terminal 16 of the very last energy storage device 12 in the string are accessible from outside.

Figure 2:
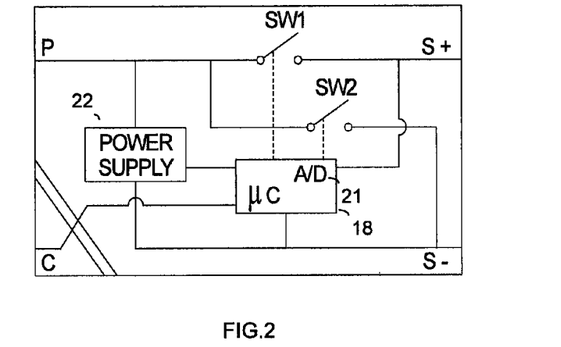
FIG. 2 is an enlarged view of a balancing unit according to embodiments of the present invention.

A balancing unit 15 according to embodiments of the present invention is schematically illustrated in an enlarged format in FIG. 2. It has a first data input port S+ and a second data input port S−. The first and second terminals 16, 17 of an energy storage device 12 are connected to the first and second data input ports S+, S− of the balancing unit 15 assigned to that energy storage device 12, so that the positive terminal 16 of the energy storage device 12 is connected to the first data input port S+ and the negative terminal 17 of the energy storage device 12 is connected to the second data input port S−. The balancing unit 15 is adapted for measuring an instantaneous electrical parameter of the associated energy storage device 12, e.g. the voltage across the two data input ports S+ and S−. In order to obtain this, the balancing unit 15 is provided with suitable measurement circuitry. In an embodiment of the present invention, this measurement circuitry is an analog input of an analog to digital converter 21 of the local microcontroller 18 present in the balancing unit 15. From the measured voltage, a charge value can be calculated as $q=C*V$. Alternatively, the instantaneous electrical parameter to be measured can be current. From the measured current, a charge value can be calculated as an integral of the current over time.

The balancing unit 15 according to embodiments of the present invention furthermore comprises an input terminal P for receiving an input signal. This input terminal is electrically connected, over a first switch SW1 and a second switch SW2, to the first and second data input ports S+ and S−, respectively. The input signal is received from the AC signal generator 14. The balancing unit 15 is adapted for actuating the first and second switches SW1, SW2 in function of the voltage level at input terminal P. This actuation of the switches SW1, SW2 is controlled by a local controller 18.

The switches SW1 and SW2 can be implemented by any suitable implementation.

The switches SW1 and SW2 can be active switches. Examples of active switches can be TRIACs or transistors such as bipolar transistors, MOSFETs. The switches SW1 and SW2 determine the direction of the current through the energy storage device depending on the requirement of charging, discharging or leaving the energy storage device unamended. In case the switches SW1 and SW2 are active switches, they need to be controlled per period of the AC signal generator 14. As an example, they may have to be open during 50 µs, closed during 50 µs and so on. This makes the controlling of the active switches complex, but at the same time also flexible.

Figure 5:
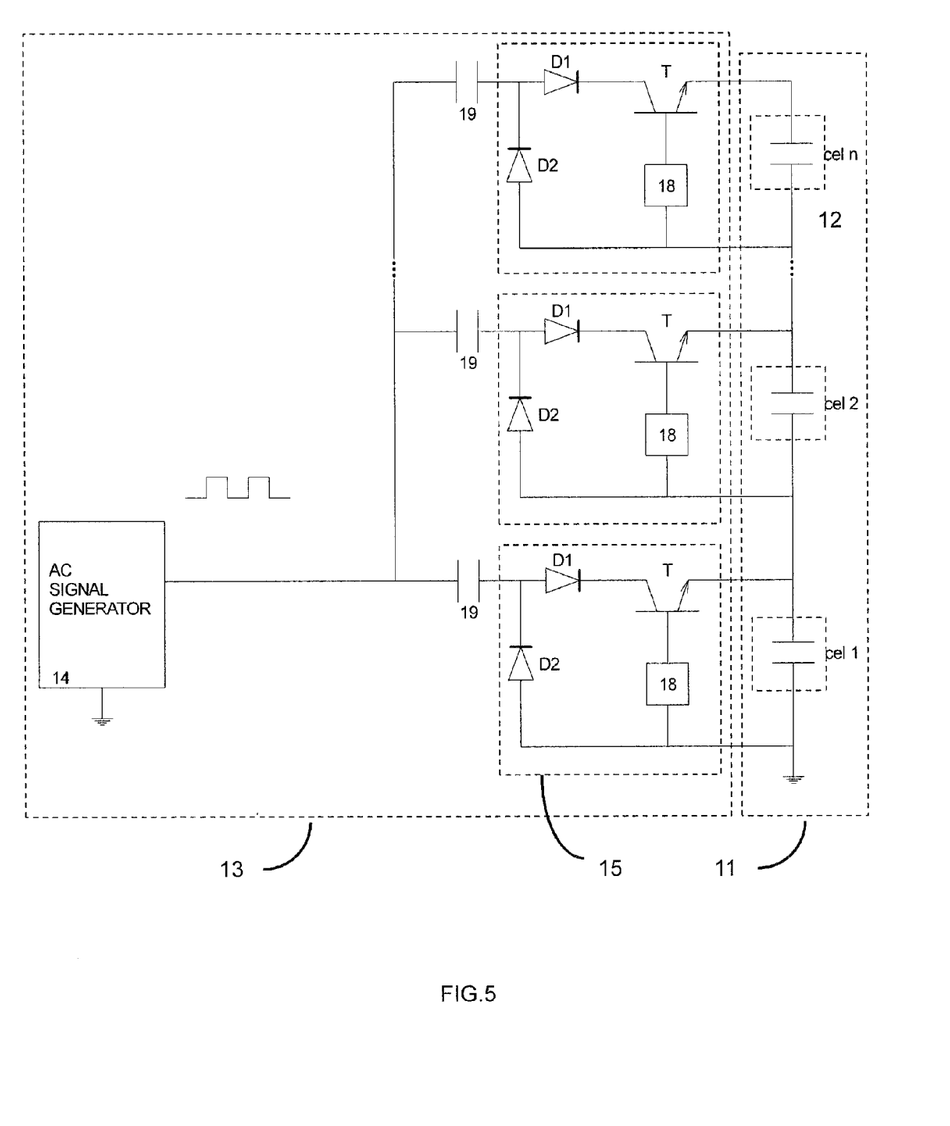
FIG. 5 schematically illustrates a rechargeable energy storage system comprising a balancing system according to another embodiment of the present invention, where the switches in the balancing units comprise diodes.

In alternative embodiments of the present invention, the switches SW1, SW2 can be passive switches, for example implemented by diodes D1, D2, as illustrated in FIG. 5. A further switch, which can be implemented by any suitable device, illustrated by means of a transistor T in FIG. 5, may be provided in order to change the direction of the current through the diodes in function of the instruction to charge, discharge or leave the energy storage device unamended. The controlling of this further switch is less complex as it is not required to control the further switch per halve period of the AC signal generator 14, but it nevertheless has the same flexibility. The further switch, in the case illustrated a transistor T, is switched on as soon as charging is started, and is blocked (switched off) when charging is stopped (balancing). This may for example be something like one hour later.

A balancing unit 15 according to embodiments of the present invention performs at least the following functions:

measuring an instantaneous electrical parameter, e.g. the voltage across the data input ports S+, S− of the associated energy storage device 12, and actuating the switches SW1, SW2 in function of the voltage level received from the AC signal generator 14 at input terminal P.

According to embodiments of the present invention, all balancing units 15 of the system 13 for balancing are coupled to the AC signal generator 14. This AC signal generator 14 can be a block wave generator, a sinusoidal signal source, a saw tooth generator, or any other type of AC signal generator. It is advantageous if the AC signal generator 14 is a high frequency signal generator, as this reduces component size. A sinusoidal signal generator is more efficient, has low peak currents hence low heat generation, and does not substantially present any switching losses. However, a block wave generator is easier to implement than a sinusoidal signal generator. The AC signal generator 14 can be powered from an external source (not illustrated), e.g. a charger, or from the series string 11 of energy storage devices 12. The AC signal generator 14 can be controlled by the main controller 20. It is advantageous to have a single AC signal generator 14 for the balancing system 13. This is different from prior art solutions where an AC signal generator is required in each balancing unit.

According to embodiments of the present invention, a plurality of AC signal generators are provided (not illustrated), and the plurality of balancing units are grouped into groups, the balancing units of one group being coupled to one of the AC signal generators. Also in this case it can be said that the system for balancing comprises a single AC signal generator, the signal generator and the group of balancing units coupled thereto forming the system for balancing. No signal generator is required in the balancing units. Advantageously a synchronously phase shifted signal may be used for reducing ripple in the local power supply of the signal generator and/or the controller.

According to embodiments of the present invention, the balancing units 15 are coupled to the AC signal generator by means of a capacitor 19. The capacitive coupling provided by the capacitors 19 is used to block common mode voltages. This is required because the energy storage devices 12 are at different and varying potential levels.

The balancing units 15, or thus the system 13 for balancing, functions as follows. Each balancing circuit 15 in first instance measures a local instantaneous electrical parameter of the associated energy storage device 12, e.g. the local voltage across its first and second terminals 16, 17, i.e. the voltage across the associated energy storage device 12. In accordance with embodiments of the present invention, this measuring can be performed via a method and device as disclosed in WO 2006/058394. In accordance with embodiments of the present invention, the measurement can be performed by means of an A/D converter, for example an A/D converter 21 which forms part of a local controller 18, local to the balancing unit 15.

In accordance with embodiments of the present invention, a measuring circuit may digitize the measured values, e.g. voltages, and transmit them to a local controller 18. The measured parameter value, e.g. voltage, determines whether the cell 12 is operating in a region where charging or discharging is required. The measured parameter value, e.g. voltage, is compared to a corresponding local reference value, e.g. voltage, that may be stored in the local controller 18, in a main controller 20 or in an associated memory (not illustrated). This comparison identifies whether the cell 12 needs charging or discharging: if the measured parameter value, e.g. voltage, exceeds the local reference value, e.g. voltage, with at least a first pre-determined threshold value, the cell 12 needs discharging, and if the measured parameter value, e.g. voltage, is at least a second pre-determined threshold value below the reference value, e.g. voltage, the cell 12 needs charging. The first and the second threshold values may be the same. In alternative embodiments, they may be different. As an example, the threshold values may be voltages of about 100 mV.

When the comparison identifies that a cell 12 needs to be charged, the controller 18 actuates the first and second switches SW1, SW2 of that cell 12 as follows:

when the signal applied at the input terminal P is at high level, the first switch SW1 is closed and the second switch SW2 is opened, and when the signal applied at the input terminal P is at low level, the first switch SW1 is opened and the second switch SW2 is closed.

Figure 3:
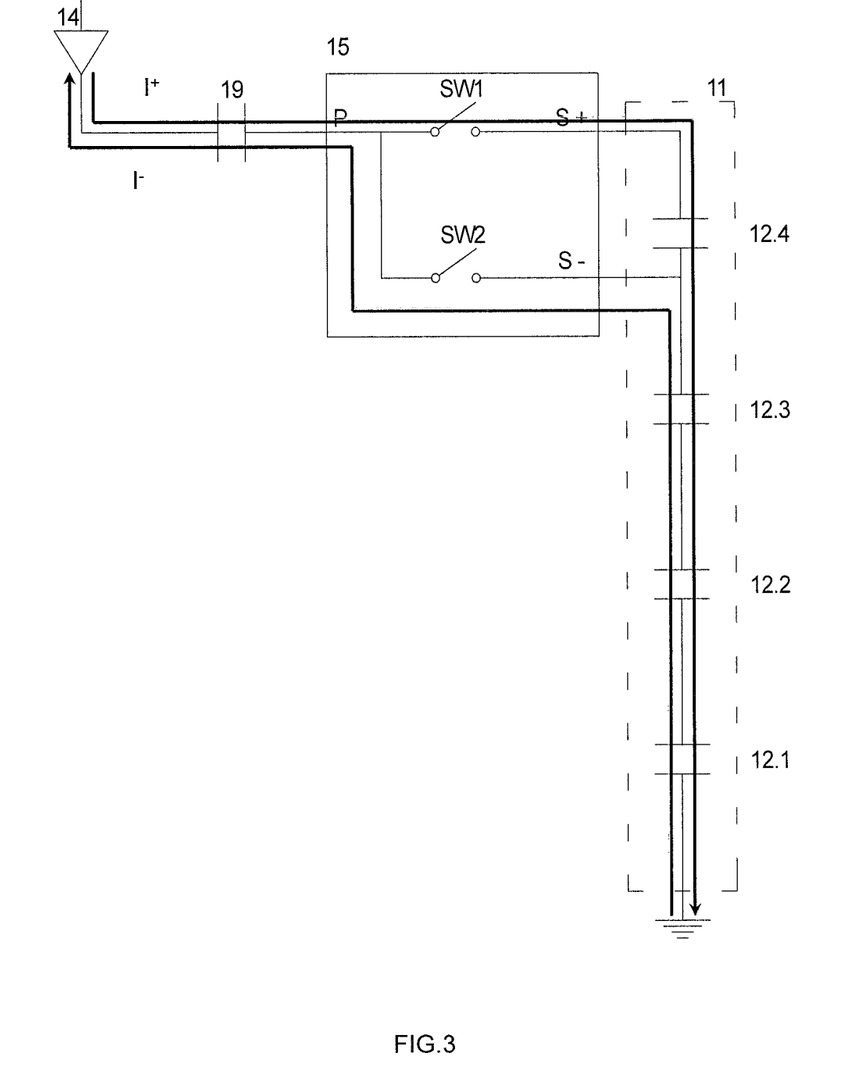
FIG. 3 schematically illustrates the functioning of a balancing system according to embodiments of the present invention.

What happens by doing this is illustrated schematically in FIG. 3 for a string 11 comprising only four energy storage devices 12.1, 12.2, 12.3 and 12.4, of which only energy storage device 12.4 needs charging. As the other energy storage devices 12.1, 12.2, 12.3 do not need charging nor discharging, the first and second switches SW1, SW2 in their associated balancing units 15 are opened, and hence not illustrated as no current will flow through these balancing units. During a positive phase of the applied AC signal generated by the AC signal generator 14, current flows through the capacitive coupling 19, through the closed switch SW1 of the balancing unit 15 associated with the energy storage device 12.4 that needs charging, and through all energy storage devices 12.4, 12.3, 12.2 and 12.1 in the string 11, as illustrated by the arrow labeled $I^+$. During a negative phase of the applied AC signal generated by the AC signal generator 14, current flows through the energy storage devices 12.1, 12.2, 12.3, through the closed switch SW2 of the balancing unit 15 associated with the energy storage device 12.4 that needs charging, and through the capacitive coupling 19 back to the AC signal generator 14, as indicated by the arrow labeled $I^-$. It can be seen that a net charging effect is obtained at the level of the energy storage device 12.4 that needed charging.

Similarly, when the comparison identifies that a cell 12 needs to be discharged, the controller 18 actuates the first and second switches SW1, SW2 of that cell 12 as follows:

when the signal applied at the input terminal P is at low level, the first switch SW1 is closed and the second switch SW2 is opened, and when the signal applied at the input terminal P is at high level, the first switch SW1 is opened and the second switch SW2 is closed.

By doing this, a net discharge effect of the cell 12 is obtained.

When a cell 12 does not need any charge nor discharge, both first and second switches of the associated balancing unit 15 are opened.

Actuating the first and second switches SW1, SW2 in this way in one balancing unit 15 allows to transfer charge from the AC signal generator to the associated energy storage device 12 or vice versa. Actuating the switches SW1, SW2 in two different balancing units 15, one in charge mode and the other one in discharge mode, allows to transfer charge from one energy storage device 12 to the other. Hence the voltage of individual cells with a low voltage can be increased, and the voltage of individual cells with a high voltage can be decreased.

Due to the capacitive coupling 19 of the individual balancing units 15, charge transfer can take place between any energy storage device 12 and the AC signal generator 14, or between any two energy storage devices 12 regardless of their potential with respect to each other. In other words, charge can be pumped from a low to a high potential if need be, if the switches are actuated in the right way. This is due to a single AC generator being used for a plurality of balancing units 15 and their associated energy storage devices 12. The energy required for charging an energy storage device 12 can emanate from another energy storage device 12 if and only if it passes via the common AC generator. If it is desired to charge an energy storage device 12 without discharging another one, then the AC generator can be powered from an external source as indicated above.

The first and second switches SW1, SW2 of a balancing unit 15 can be actuated by a local controller 18, for example a microcontroller. It can draw power from the input terminal P by rectifying the AC signal, e.g. a block wave.

The AC signal, e.g. block wave, from signal generator 14 appears at the input terminal P of the balancing unit 15 at the correct common mode potential as the common mode was blocked by capacitor 19. This is an ordinary AC signal even if it is distorted by capacitor 19. So it can be rectified, for example by a conventional diode bridge followed by a filter capacitor and regulator, to form a very classical power supply 22 for the local controller 18.

According to embodiments of the present invention, decisions on charging or discharging of energy storage devices or on energy storage devices remaining unaffected, may be taken locally in the balancing units 15, for example by the local controllers 18.

According to alternative embodiments of the present invention, a balancing unit 15 furthermore has a control terminal C adapted to be used for communication between the local controller 18 of the balancing unit and a main controller 20 of the system 13 for balancing. The main controller 20 may be a computing unit on which a specific software program is run. This computing unit evaluates data collected from the local controllers 18 and retransmits commands to the local controllers based on the evaluation results. Data to be exchanged between the local controllers 18 and the main controller may be limited to the actual instantaneous voltage of the energy storage device 12 associated with the balancing unit 15, as measured during the measuring step, which is sent from the local controller 18 to the main controller 20, and a command for charging, discharging or leaving the cell unaffected, which is sent from the main controller 20 to the local controllers 18. The local controller 18 may also communicate to the main controller 20 whether its associated energy storage device 12 is operating in its normal operating window. This may be important as energy storage devices 12 may not be charged above their maximum operating voltage, nor may they be discharged below their minimum operating voltage. The data communication between the local controllers 18 and the main controller 20 may take place over a data bus, preferably a single common data bus connecting all balancing units 15 and the main controller 20, such as for example a CAN bus. On this data bus, the main controller 20 may be a master and the local controllers 18 may be slaves. The main controller 20 may initiate all communication to all local controllers 18 simultaneously or to one individual local controller 18.

The main controller 20 may be adapted for controlling the AC signal generator 14 for generating the AC signal.

During a balancing (charging or discharging) cycle, the main controller 20 requests a new set of measurements from each of the local controllers 18, and designates the cells 12 to be equalized at a predetermined frequency, e.g. every 10 s.

Between two decision moments the voltage across the energy storage device may vary strongly, e.g. in automotive due to braking or acceleration of a motor vehicle. This is not a problem in embodiments of the present invention; balancing continues to be carried out with a same current level, independent of the instantaneous voltage across the energy storage device. This means that, once balancing is started (with a pre-determined current level), the end time of charging or discharging is known, and a next decision moment can be scheduled. This is independent from the use of the energy storage devices.

It is to be noted that balancing in accordance with embodiments of the present invention does not necessarily mean that all voltages across the energy storage devices 12 are made equal. In particular embodiments, when it is required to balance a string 11 of ultracapacitors 12, the maximal amount of energy can be stored in the string 11 when, during charging, all capacitors 12 reach their maximum voltage simultaneously. When balancing at a lower voltage, the target voltage for an individual cell 12 is a function of the capacity of that individual cell 12. The balancing system 13 according to embodiments of the present invention allows to balance at any arbitrary voltage and it does not imply that voltages across energy storage devices 12 should be equal at some point. This is advantageous as it allows every individual cell, and therefore the whole string to store the maximum possible amount of energy.

The balancing method and device according to embodiments of the present invention allows to obtain overvoltage and undervoltage protection. It is advantageous that a balancing system 15 in accordance with embodiments of the present invention provides such overvoltage and undervoltage protection, without supplementary hardware features being required. Moreover, a balancing system 13 in accordance with embodiments of the present invention may function better with respect to overvoltage and undervoltage protection than particular prior art solutions.

As an example a string 11 is considered, in which 100 energy storage devices 12 are coupled in series, each having a maximum voltage level of 3 Volts. All energy storage devices 12 are at a voltage level of 2 Volts, except one (further called "the higher energy storage device") which is at a voltage level of 2.5 Volts. The total voltage over the string 11 is 200.5 Volts. The maximum voltage of the string, if all energy storage devices 12 would behave equally and would be at the same voltage level at all times, would be 300 Volts. Hence, the total string lacks a voltage of 99.5 Volts, and if an equal amount would be applied to each of the energy storage devices 12, then this means that each energy storage device 12 would be charged with 0.995 Volts. However, if the higher energy storage device 12 (at 2.5 Volts) is charged with 0.995 Volts on top, its voltage level would exceed the maximum allowed voltage level for that energy storage device 12. Now, if one knows the voltage level of the higher energy storage device (2.5 Volts), it can be determined that this higher energy storage device only lacks 0.5 Volts up to the maximum voltage level. If 0.5 Volts are added to each of the 100 energy storage devices 12, the total of the string is 250.5 Volts, and the voltage level of the higher energy storage device is 3 Volts, so no overvoltage occurs. Hence, by communicating to a charging system (which may e.g. be a braking system) the voltage level of the higher energy storage device in the string, overvoltages are anticipated, even if no balancing has taken place yet.

Figure 4:
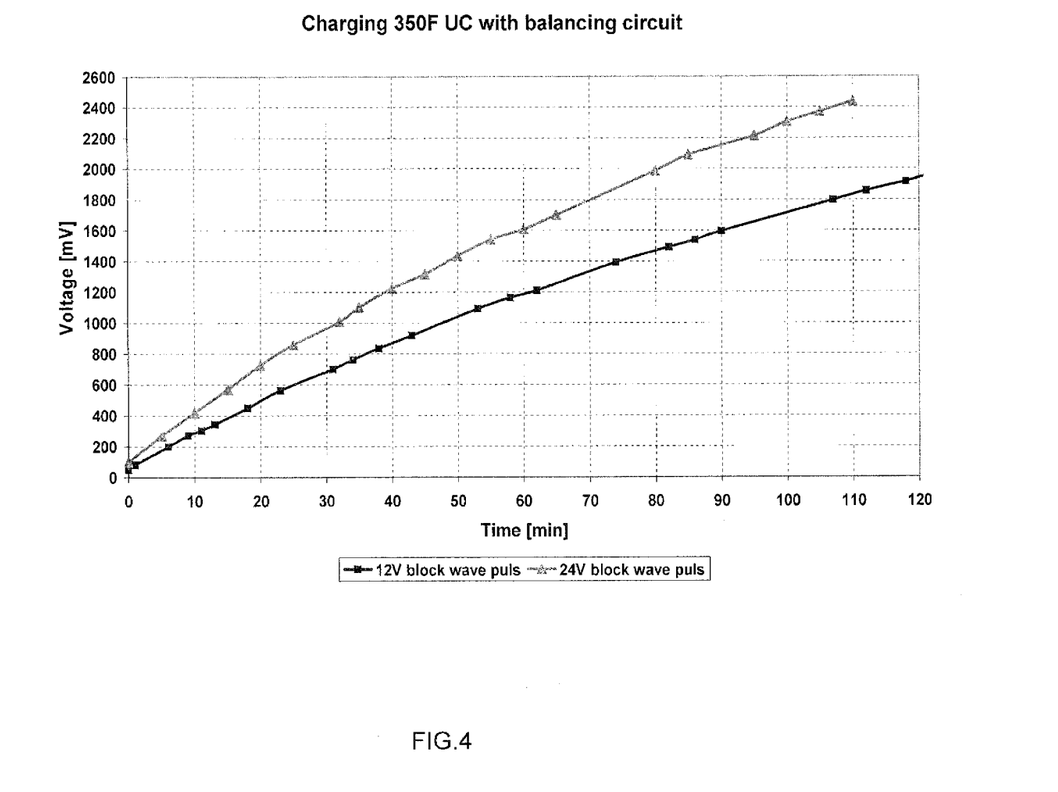
FIG. 4 shows measurement data of a balancing circuit according to embodiments of the present invention.

FIG. 4 illustrates simulation results, simulating charging of a 350 Farad ultracap with a balancing circuit according to embodiments of the present invention. The simulation results show a charging curve with two different amplitudes for the applied AC signal, in particular a block wave with 12 Volts amplitude and a block wave with 24 Volts amplitude.

Figure 6:
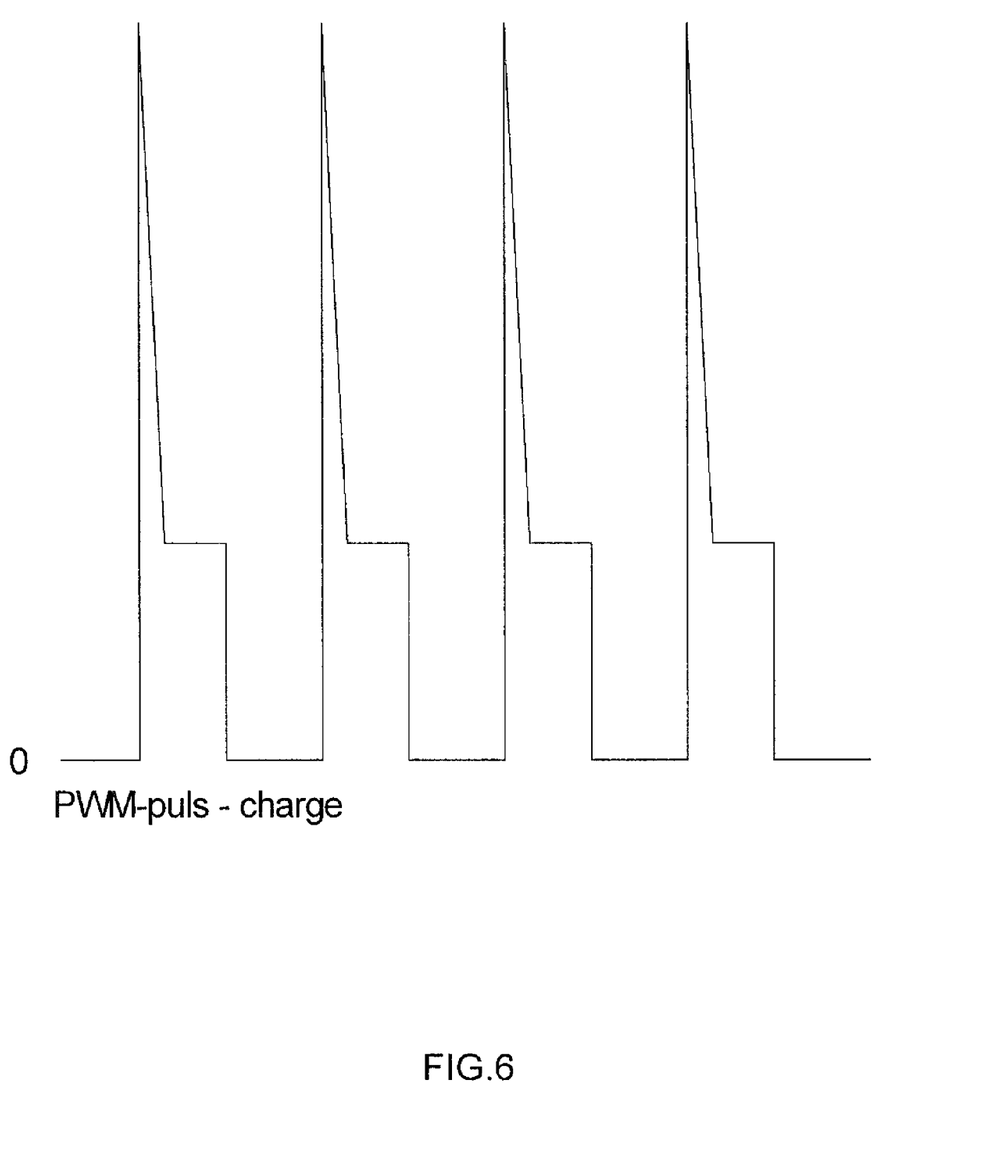
FIG. 6 illustrates a typical charge waveform in embodiments of the present invention.

A typical charge waveform is illustrated in FIG. 6. During the peak pulse, the energy storage devices are charged. As an example only, an average charge current of 100 mA can be reached with a balancing circuit according to embodiments of the present invention, in particular for example a balancing circuit as illustrated in FIG. 5.

Table 1 gives an example of charging results of the balancing circuit of FIG. 5. With a voltage across the energy storage devices 12 of 2 Volts, and a PWM voltage of 12 Volts, the average charge current is about 60 mA; with a PWM pulse of 24 Volts the average charge current is about 120 mA.

| PWM-pulse voltage | Average charge current with voltage across energy storage device 2 Volts |
|---|---|
| 12 V | 60 mA |
| 24 V | 120 mA |

While the invention has been illustrated and described in detail in the drawings and foregoing description, such illustration and description are to be considered illustrative or exemplary and not restrictive. The invention is not limited to the disclosed embodiments.

For example, it is possible to operate the invention in an embodiment wherein SW1 is replaced with a diode conducting the current towards S+ in series with a NPN transistor and SW2 is replaced with a diode conducting the current away from S−. In this case the transistor is switched on when a cell needs charging, the diodes conduct the current during the appropriate cycles of the block wave 14. A discharging circuit can be constructed in a similar way but may also be omitted altogether if the cause of imbalance between cells is only due to excessive leakage currents in a limited number of cells.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The foregoing description details certain embodiments of the invention. It will be appreciated, however, that no matter how detailed the foregoing appears in text, the invention may be practiced in many ways.

The invention claimed is:

1. A system for balancing charge over a plurality of rechargeable energy storage devices coupled in series, the system comprising:
a plurality of balancing units each assigned to one of the rechargeable energy storage devices,
an AC signal generator providing an AC signal to the plurality of balancing units for balancing the charge on their assigned rechargeable energy storage devices,
a capacitive coupling between the AC signal generator and each of the plurality of balancing units that enables common mode rejection,
wherein a first balancing unit comprises:
a first and a second active switch facilitating the connection of a positive or negative terminal, respectively, of the assigned rechargeable energy storage device to the AC signal generator, a return path being to ground, and
a controller controlling the first and second switches configured in a way so as to transfer charge, if a first energy storage device to which the first balancing unit is assigned needs to be charged, selectable from either one of:
a) charging from the AC signal generator and
b) charging from at least a second energy storage device assigned to at least a second balancing unit via the AC signal generator, and,
if the first energy storage device to which the first balancing unit is assigned needs to be discharged, by one of:
c) selectively transferring to the AC signal generator and
d) transferring charge via the AC signal generator to at least the second energy storage device of the at least second balancing unit or another energy storage device assigned to another of the plurality of balancing units thereby discharging the first energy storage device assigned to the first balancing unit.

2. The system according to claim 1, comprising a comparator comparing an instantaneous electrical parameter of the rechargeable energy storage device with a corresponding reference parameter.

3. The system according to claim 2, wherein the controller is configured to control the switches based on a signal generated by the comparator.

4. The system according to claim 1, comprising a main controller for controlling which ones of the rechargeable energy storage devices need to be balanced.

5. The system according to claim 4, comprising a data bus providing communication between a local controller and the main controller.

6. The system according to claim 4, wherein the main controller is configured to protect the rechargeable energy storage devices against overvoltage and/or undervoltage.

7. A rechargeable energy storage system comprising a system according to claim 1 for balancing charge over a plurality of rechargeable energy storage devices coupled in series.

8. The system according to claim 1, including a single AC signal generator common to the plurality of balancing circuits.

9. A rechargeable energy storage system comprising a system according to claim 2 for balancing charge over a plurality of rechargeable energy storage devices coupled in series.

10. A rechargeable energy storage system comprising a system according to claim 3 for balancing charge over a plurality of rechargeable energy storage devices coupled in series.

11. A rechargeable energy storage system comprising a system according to claim 4 for balancing charge over a plurality of rechargeable energy storage devices coupled in series.

12. A rechargeable energy storage system comprising a system according to claim 5 for balancing charge over a plurality of rechargeable energy storage devices coupled in series.

13. A rechargeable energy storage system comprising a system according to claim 6 for balancing charge over a plurality of rechargeable energy storage devices coupled in series.

14. A method of balancing charges of rechargeable energy storage devices having two terminals and being coupled in series, the method comprising:
measuring an instantaneous electrical parameter across the terminals of one of said energy storage devices, comparing the measured electrical parameter to a pre-determined parameter value, depending on the comparison result, transferring charge to or discharging from a particular energy storage device by actuating two active switches, wherein the step of transferring charge comprises providing an AC signal to a first balancing unit coupled to a first rechargeable energy storage device, the transferring of charge taking place over a single line, with ground forming the return path, and depending on the signal of the AC signal and the comparison result transferring charge by selecting charging from one of:

a) the first balancing unit applying the AC signal from the AC signal generator to the first rechargeable energy storage device, and b) charge being transferred from a second rechargeable energy storage device assigned to a second balancing unit via the AC signal generator to the first rechargeable energy storage device, said transferring charge step including common mode rejection by capacitive coupling, and wherein discharging is selected from one of;

c) selectively transferring to the AC signal generator, and d) transferring charge via the AC signal generator to at least the second energy storage device assigned to the second balancing unit or another energy storage device assigned to another of the plurality of balancing units thereby discharging the first energy storage device assigned to the first balancing unit.

\* \* \* \* \*